US006986111B2

(12) United States Patent
Urakawa

(10) Patent No.: US 6,986,111 B2
(45) Date of Patent: Jan. 10, 2006

(54) SELF-DIAGNOSTIC CIRCUIT OF I/O CIRCUIT SYSTEM

(75) Inventor: Kosuke Urakawa, Miyagi-Gun (JP)

(73) Assignee: Tokyo Electron Limited, Tokyo (JP)

( * ) Notice: Subject to any disclaimer, the term of this patent is extended or adjusted under 35 U.S.C. 154(b) by 364 days.

(21) Appl. No.: 10/383,057

(22) Filed: Mar. 7, 2003

(65) Prior Publication Data

US 2004/0177331 A1 Sep. 9, 2004

Related U.S. Application Data

(63) Continuation of application No. PCT/JP01/07651, filed on Sep. 4, 2001.

(30) Foreign Application Priority Data

Sep. 8, 2000 (JP) ....................................... 2000-272644

(51) Int. Cl.
*G06F 17/50* (2006.01)

(52) U.S. Cl. ................................................ 716/4; 716/1

(58) Field of Classification Search .................. 716/1–8
See application file for complete search history.

(56) References Cited

U.S. PATENT DOCUMENTS 5,450,330 A * 9/1995 Zapisek ......................... 716/4
5,828,577 A * 10/1998 Ehlig ............................ 716/4
6,286,127 B1 * 9/2001 King et al. .................... 716/8
6,622,286 B1 * 9/2003 Ngo et al. ..................... 716/1

FOREIGN PATENT DOCUMENTS

| | | |
|---|---|---|
| JP | 2-244855 | 9/1990 |
| JP | 5-316216 | 11/1993 |
| JP | 8-194528 | 7/1996 |
| JP | 10-124408 | 5/1998 |
| JP | 11-143790 | 5/1999 |

* cited by examiner

*Primary Examiner*—Matthew Smith
*Assistant Examiner*—Binh Tat
(74) *Attorney, Agent, or Firm*—Oblon, Spivak, McClelland, Maier & Neustadt, P.C.

(57) ABSTRACT

An I/O circuit system incorporated in the main controller of a semiconductor manufacturing apparatus or the like includes a self-diagnostic circuit in which tie switches are interposed between output channels which output control signals in order to drive and control apparatus-side driving portions constructed on an I/O board, and input channels which input return signals and sensor signals in response to the control signals, and self-diagnostic switches which disconnect power supply lines to the apparatus-side driving portions are arranged. To perform self-diagnosis upon generation of a fault or the like, the self-diagnostic switches are in a nonconductive state, and the tie switches are in a conductive state to electrically disconnect the apparatus. If a return signal corresponding to a self-diagnostic signal output from the main controller is returned, no electrical fault is determined to occur. If no return signal is returned, an electrical fault is determined to have occurred.

34 Claims, 5 Drawing Sheets

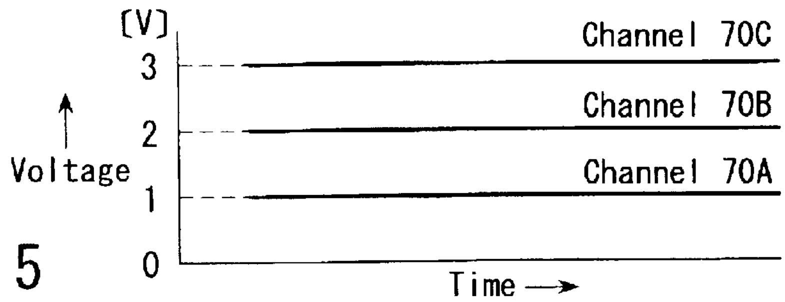
FIG. 5
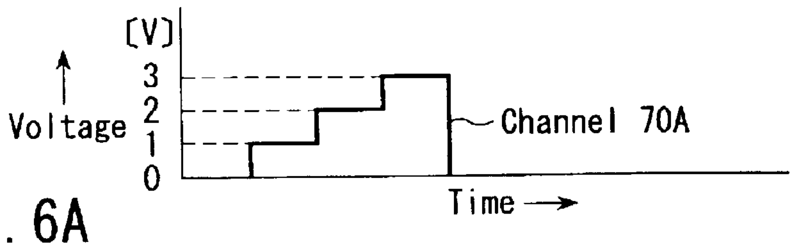
FIG. 6A
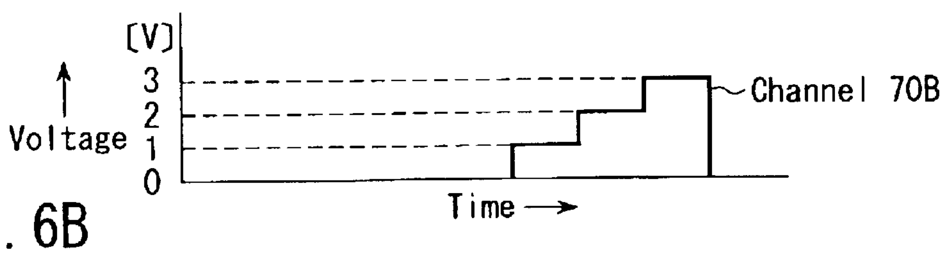
FIG. 6B
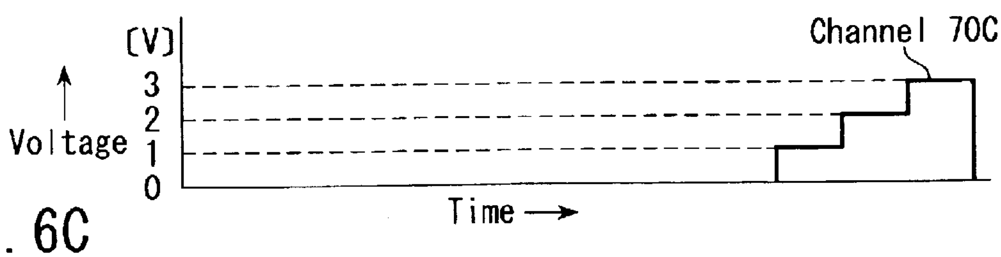
FIG. 6C
FIG. 8A
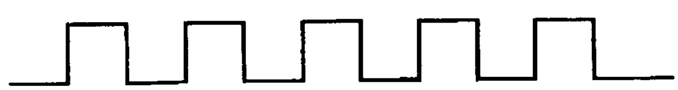
FIG. 8B
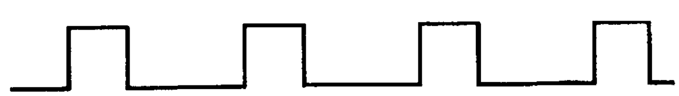
FIG. 8C
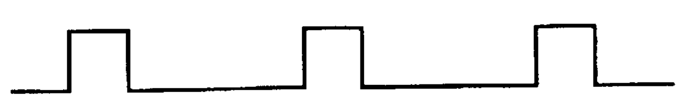

SELF-DIAGNOSTIC CIRCUIT OF I/O CIRCUIT SYSTEM

CROSS-REFERENCE TO RELATED APPLICATIONS

This is a Continuation Application of PCT Application No. PCT/JP01/07651, filed Sep. 4, 2001, which was not published under PCT Article 21(2) in English.

This application is based upon and claims the benefit of priority from the prior Japanese Patent Application No. 2000-272644, filed Sep. 8, 2000, the entire contents of which are incorporated herein by reference.

BACKGROUND OF THE INVENTION

1. Field of the Invention

The present invention relates to a self-diagnostic circuit for an I/O circuit system incorporated in the controller of a semiconductor manufacturing apparatus or the like.

2. Description of the Related Art

In general, many driving systems and various sensors (to be referred to as driving portions) are attached to a semiconductor manufacturing apparatus or the like in order to drive each building portion. For example, to operate the driving systems, a main controller having a microcomputer properly acquires analog or digital sensor outputs from the sensors of the driving systems. The main controller analyzes these sensor outputs, and sends a control instruction to each driving system in accordance with a control sequence or control program in order to cause the driving system to perform a predetermined operation. For example, to introduce process gas into a processing chamber, the main controller instructs a flow controller of the gas species or gas flow rate corresponding to processing to be performed for a semiconductor wafer (to be referred to as a wafer hereinafter). The flow controller sends a return signal concerning the gas flow rate or the like to the main controller, and feedback control is executed. Similarly, the main controller instructs a high-frequency power supply for generating a plasma of a high-frequency power output value to be applied. A stable plasma is generated by control based on a return signal from the high-frequency power supply or a sensor signal from a sensor arranged in the processing chamber. The main controller drives an exhaust system on the basis of a measurement value from a pressure gauge which detects the internal pressure of the processing chamber. The main controller controls the pressure so as to set a desired pressure in the processing chamber.

Control signals and sensor signals exchanged between the main controller and each driving system or sensor system are used after conversion into analog and digital signals.

Each building portion which constitutes an apparatus generally undergoes part replacement, adjustment, and the like by general maintenance. Depending on the degree of maintenance, a signal cable which connects building portions may be disconnected. When the signal cable is disconnected, whether the cable is correctly connected must be checked at the start of operation.

Even with periodic maintenance, part replacement, adjustment, and the like, damage to a part, an adjustment error, short-circuiting in a circuit, or the like may occur for some reason. Quick corrective maintenance is required for such a fault. It is therefore important to quickly detect which of many circuit networks or which of parts suffers a fault.

In a conventional apparatus arrangement, a fault can be detected at each building portion within a relatively short time. However, when building portions are assembled into an apparatus and connected to each other by cables or the like, it is very difficult to detect which part suffers an electrical defect or which portion was the cause. For this reason, building portions must be checked by disconnecting cables, or a faulty portion is detected on the basis of empirical knowledge of the operator or by checking the previous fault log. A long time is taken for detecting a faulty portion.

BRIEF SUMMARY OF THE INVENTION

It is an object of the present invention to provide a self-diagnostic circuit for an I/O circuit system that can quickly, easily detect an electrically defective portion.

To achieve the above object, the present invention provides a self-diagnostic circuit for an I/O circuit system that is mounted in the I/O circuit system incorporated in the controller of a semiconductor manufacturing apparatus or the like, comprises tie switches interposed between output channels which output control signals in order to drive and control apparatus-side driving portions constructed on an I/O board, and input channels which input return signals in response to the control signals, and self-diagnostic switches arranged on power supply lines for supplying power to the driving portions of the apparatus and stop power supply to the driving portions.

To achieve the above object, the present invention provides a self-diagnostic circuit for an I/O circuit system that is mounted in the I/O circuit system which is incorporated in a main controller for controlling and driving an apparatus having a plurality of driving portions and has a plurality of output and input channels, and that comprises tie switches which connect the corresponding output channels and input channels in the I/O circuit, and self-diagnostic switches which are arranged on lines of the output and input channels in the I/O circuit and electrically disconnect the apparatus-side driving portions, wherein in normal operation, the apparatus is driven and controlled by the main controller via the tie switches in a nonconductive state and the self-diagnostic switches in a conductive state, and in self-diagnosis, self-diagnostic signals output from the main controller to the output channels are returned to the main controller via the input channels by using the tie switches in the conductive state and the self-diagnostic switches in the nonconductive state, determining that the I/O circuit system is normal.

According to the present invention, in normal operation, the tie switches are in a nonconductive state, and the self-diagnostic switches are in a conductive state, outputting signals to apparatus-side building portions via the output digital channels. Return signals from the building portions or sensor signals from sensors attached to the building portions are input to the main controller via the input channels, controlling the building portions. In self-diagnosis, the self-diagnostic switches are in a nonconductive state, and all the tie switches are in a conductive state to electrically disconnect the apparatus. The loopbacks of the output and input channels are constructed. If a return signal corresponding to a self-diagnostic signal output from the main controller is returned, no electrical fault is determined to occur. If no return signal is returned, an electrical fault is determined to have occurred.

BRIEF DESCRIPTION OF THE SEVERAL VIEWS OF THE DRAWING

FIG. 5 is a waveform chart showing an example of a analog self-diagnostic signal in the self-diagnostic circuit according to the second embodiment;

FIGS. 6A, 6B, and 6C are waveform charts showing modifications to an analog self-diagnostic signal;

FIGS. 8A, 8B, and 8C are waveform charts showing examples of a digital self-diagnostic signal in the self-diagnostic circuit according to the third embodiment.

DETAILED DESCRIPTION OF THE INVENTION

Embodiments according to the present invention will be described in detail below.

Figure 1:
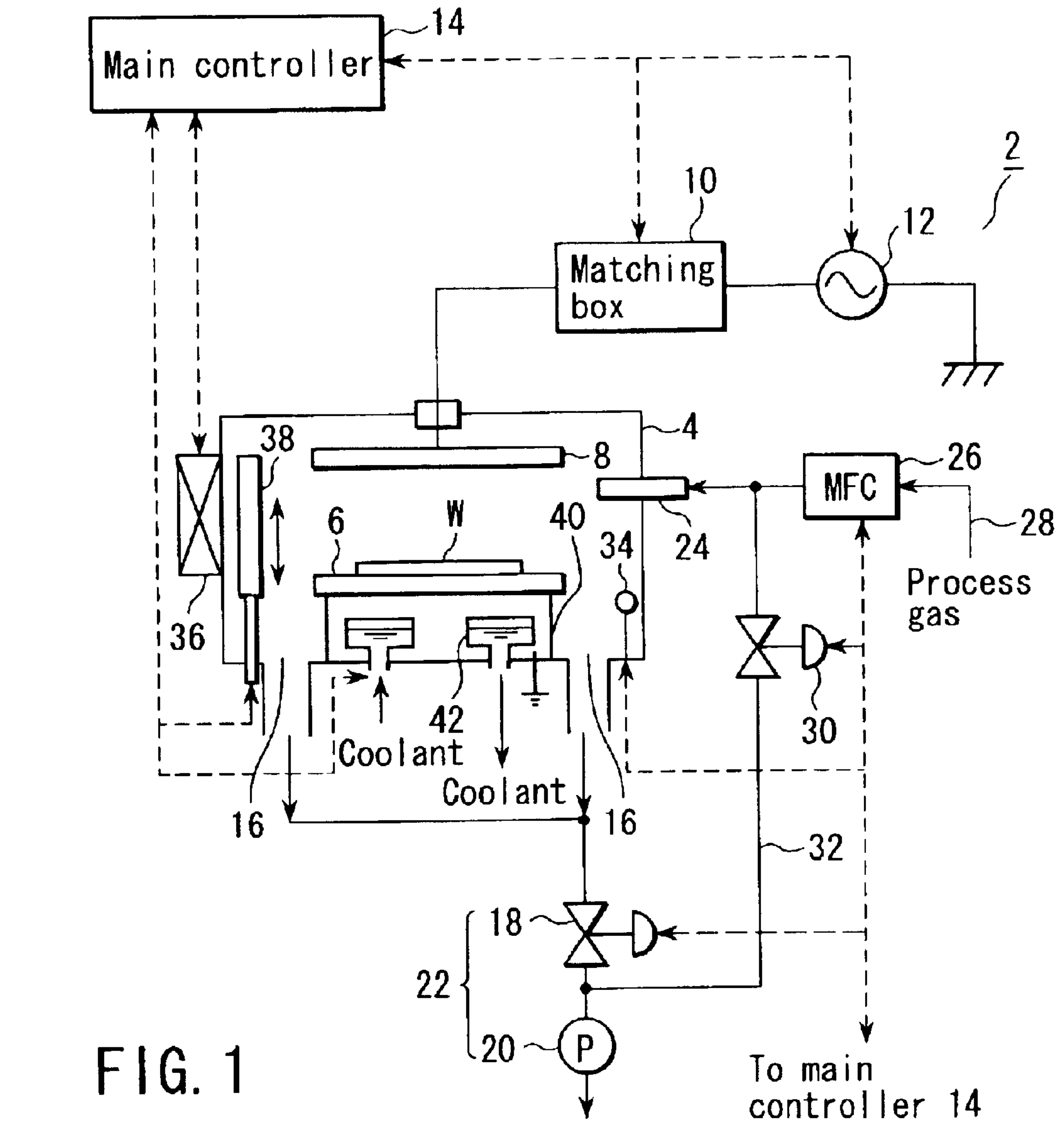
FIG. 1 is a diagram showing an arrangement of a semiconductor manufacturing apparatus which incorporates the self-diagnostic circuit of an I/O circuit system according to the present invention.

FIG. 1 is a diagram showing the schematic arrangement of a semiconductor manufacturing apparatus which incorporates the self-diagnostic circuit of an I/O circuit system according to the present invention. An object to be controlled is the driving portion of the semiconductor manufacturing apparatus, and the apparatus is, e.g., a plasma etching apparatus.

A semiconductor manufacturing apparatus 2 having, e.g., a cylindrical processing chamber 4. The processing chamber 4 incorporates a lower electrode 6 serving as a susceptor, and an upper electrode 8 which is arranged above and parallel to the lower electrode 6. A semiconductor wafer W serving as an object to be processed is set on the lower electrode 6.

The upper electrode 8 is connected via a matching box 10 to a high-frequency generator 12 capable of changing the output. A high-frequency output is applied to the upper electrode 8 to generate a plasma between the upper and lower electrodes 8 and 6. The matching coefficient of the matching box 10 and the high-frequency output of the high-frequency generator 12 are controlled by a main controller 14 having a microcomputer or the like.

An evacuation system 22 is connected to an exhaust port 16 formed in the bottom of the processing chamber 4. The evacuation system 22 is constituted by connecting, via an exhaust pipe, a pressure control valve 18 whose opening is adjustable, and a vacuum pump 20. The valve opening of the pressure control valve 18 and the exhaust ability of the vacuum pump 20 are also controlled by the main controller 14.

The semiconductor manufacturing apparatus 2 also comprises a gas supply system 28 for supplying the necessary process gas into the processing chamber 4 in accordance with an instruction from the main controller 14 while controlling the flow rate. The gas supply system 28 is constituted by connecting, via a gas pipe, a gas nozzle 24 which is arranged in the side wall of the processing chamber 4, a flow controller 26 such as a mass-flow controller, and a process gas source (not shown). In general, a gas supply system which treats a plurality of types of gases is made up of a plurality of gas lines. In this embodiment, only one gas line is illustrated, for simplicity, in FIG. 1.

An evacuation line 32 which is branched from a portion between the gas nozzle 24 and the flow controller 26 and connected to the evacuation system 22 via an evacuation on-off valve 30 is arranged in the gas supply system 28. The evacuation on-off valve 30 is in a nonconductive state/in a conductive state under the control of the main controller 14. This allows exhausting unwanted gas to the evacuation system 22 via the evacuation line 32 without supplying gas into the processing chamber 4 until the flow controller 26 can stably supply process gas.

A pressure sensor 34 having, e.g., a capacitance manometer is installed in the processing chamber 4. Detection data obtained from the pressure sensor is output to the main controller 14.

A load/unload port for the wafer W is formed in the side wall of the processing chamber 4. An externally openable/closable gate valve 36 is so arranged as to close the load/unload port. A shutter member 38 which can be elevated is so arranged as to cover the load/unload port from inside the processing chamber 4. The shutter member 38 can easily achieve thermal equilibrium in the processing chamber 4. Opening/closing driving of the gate valve 36 and elevating driving of the shutter member 38 are controlled by the main controller 14. The gate valve 36, shutter member 38, evacuation on-off valve 30, and the like are in a nonconductive state/in a conductive state by air cylinders (not shown) having solenoids. For example, photosensors (not shown) for detecting the nonconductive/conductive state are arranged near the movable portions of the air cylinders. A cooling jacket 42 which can change the cooling temperature is arranged in a support 40 which supports the lower electrode 6. The cooling temperature is controlled by the main controller 14.

Figure 3:
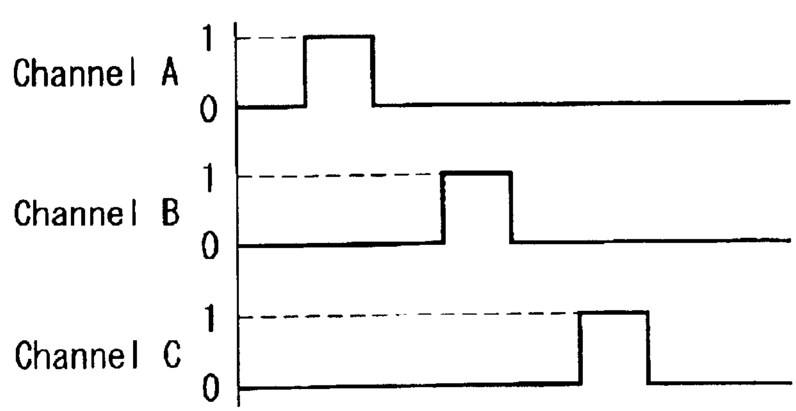
FIG. 3 is a waveform chart showing an example of a digital self-diagnostic signal in the self-diagnostic circuit according to the first embodiment.
Figure 2:
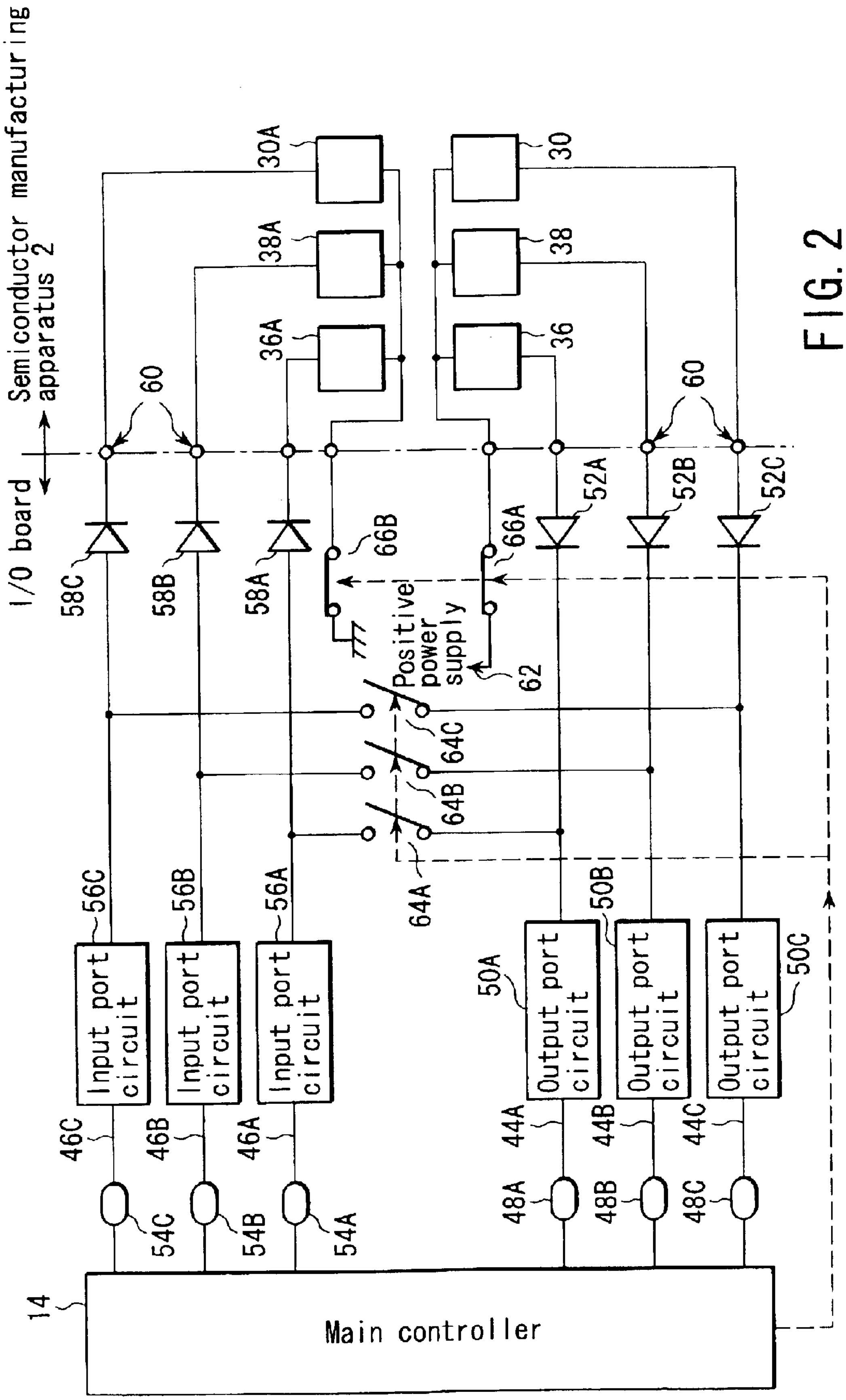
FIG. 2 is a diagram showing the arrangement of the self-diagnostic circuit of an I/O circuit system according to the first embodiment of the present invention.

The first embodiment according to the present invention will be explained with reference to FIG. 2 showing an example in which the self-diagnostic circuit of the I/O circuit system driven by a digital signal is applied to the semiconductor manufacturing apparatus 2. FIG. 3 is a waveform chart showing a digital self-diagnostic signal used for self-diagnosis in this embodiment.

Output digital channels 44A, 44B, and 44C, and input digital channels 46A, 46B, and 46C are illustrated as an example of three signal paths for the main controller 14. In practice, many channels are arranged in accordance with the control.

The output digital channels 44A to 44C are respectively connected to photocouplers 48A to 48C, output port circuits 50A to 50C which incorporate various circuit elements, and diodes 52A to 52C. The input digital channels 46A to 46C are respectively connected to photocouplers 54A to 54C, input port circuits 56A to 56C which incorporate various circuit elements, and diodes 58A to 58C.

The output digital channels 44A to 44C, and input digital channels 46A to 46C are terminated at many terminals 60. The arrangement up to the terminals 60 constitutes a digital I/O circuit system. In practice, the I/O circuit system is constituted by mounting the above-mentioned building portions (output port circuits, input port circuits, and the like) on an I/O board.

This I/O circuit system is connected to various driving systems and sensors of the above-described semiconductor manufacturing apparatus 2. For example, the output digital channels 44A to 44C are respectively connected to the solenoids of the gate valve 36, shutter member 38, and evacuation on-off valve 30 serving as loads. The other terminal of each solenoid is commonly connected, returns to the I/O board, and is connected to a positive power supply 62.

The input digital channels 46A to 46C are respectively connected to one terminal of a sensor 36A which detects the nonconductive/conductive state of the gate valve 36, one terminal of a sensor 38A which detects the elevating state of the shutter member 38, and one terminal of a sensor 30A which detects the nonconductive/conductive state of the evacuation on-off valve 30. The other terminal of each sensor is commonly connected, returns to the I/O board, and is grounded to a ground potential. Note that the sensors 36A, 38A, and 30A are so constituted as to be turned on upon detection.

The self-diagnostic circuit as the gist of the present invention is arranged in the I/O circuit system.

As shown in FIG. 2, tie switches (bypass switch) 64A, 64B, and 64C are respectively interposed between the lines of the output digital channels 44A to 44C and the lines of the input digital channels 46A to 46C. The tie switches 64A to 64C are interposed between the port circuits 50A to 50C and 56A to 56C, and the diodes 52A to 52C and 58A to 58C.

On the I/O board, self-diagnostic switches 66A and 66B are respectively interposed between the positive power supply 62 and a signal line extending from loads, i.e., the gate valve 36, shutter member 38, and evacuation on-off valve 30, and between ground and a signal line extending from the sensors 36A, 38A, and 30A.

The tie switches 64A to 64C integrally operate to be opened (nonconductive state) in normal operation and closed (conductive state) in self-diagnosis. The self-diagnostic switches 66A and 66B integrally operate to be in a conductive state in normal operation and in a nonconductive state in self-diagnosis. Note that the tie switches 64A to 64C are allowed to have a small resistance load even in the conductive state, and semiconductor switches such as FETs may be used. However, it is not preferable that the self-diagnostic switches 66A and 66B have a resistance load in the closed state (conductive state), and relay switches having metal contact pieces are preferably used.

A self-diagnostic operation in the I/O circuit system having this arrangement will be explained. To normally operate the semiconductor manufacturing apparatus 2, the tie switches 64A to 64C are in a nonconductive state, and the self-diagnostic switches 66A and 66B are in a conductive state. FIG. 2 shows a normal operation state.

In this state, the main controller 14 individually sends control signals, complying with the semiconductor device manufacturing process, to the output digital channels 44A to 44C. The gate valve 36, shutter member 38, and evacuation on-off valve 30 are respectively driven and controlled. In response to this, sensor signals from the sensors 36A, 38A, and 30A are input to the main controller 14 via the input digital channels 46A to 46C.

Self-diagnosis is performed when whether the I/O circuit is properly connected is to be checked at the start of operation after a wiring cable is temporarily disconnected for maintenance or repair of the semiconductor manufacturing apparatus and then connected, or when any electrical fault occurs in the I/O circuit and the I/O circuit must be checked to detect the faulty portion.

In self-diagnosis, the respective switches are switched to be in an opposite state to those in normal operation. More specifically, the self-diagnostic switches 66A and 66B are in a nonconductive state to disconnect the power supply 62 and ground potential. All the tie switches 64A to 64C are in a conductive state to construct loopback. As a result, the output digital channels 44A to 44C and input digital channels 46A to 46C are electrically connected (short-circuited). As an example of the loopback, a loop of the photocoupler 48A, output port circuit 50A, tie switch 64A, input port circuit 56A, and photocoupler 54A is formed.

The main controller 14 outputs digital self-diagnostic signals of pulse signals "1" as shown in FIG. 3 to the output digital channels 44A to 44C. The main controller 14 reads return signals which appear in the input digital channels 46A to 46C every time the main controller 14 receives signals.

The channel 44A shown in FIG. 3 exhibits an example of a digital self-diagnostic signal output to the output digital channel 44A. The channel 44B exhibits an example of a digital self-diagnostic signal output to the output digital channel 44B. The channel 44C exhibits an example of a digital self-diagnostic signal output to the output digital channel 44C. A "1" signal is output to the channels 44A to 44C with a small timing shift. If the same "1" signal is input from the input digital channels 46A to 46C at the same timing, the channels are determined to be normal.

To the contrary, if the "1" signal is input from the input digital channels 46A to 46C at different timings or a plurality of "1" signals are input, the channels are determined to be short-circuited. If no "1" signal is input, it is determined that a corresponding channel is disconnected or any one of the output port circuits 50A to 50C or an element in any one of the corresponding input port circuits 56A to 56C is damaged.

The "1" signal is output as a digital self-diagnostic signal to the channels at different timings because if the pulse is output to the channels at the same timing and the channels are short-circuited, the short-circuited portion cannot be detected.

In the above-described way, the self-diagnostic circuit having a relatively simple arrangement can quickly, easily specify and detect a channel in which a fault or the like occurs. In this embodiment, the digital self-diagnostic signal is supplied only once. Diagnostic operation may be repeated a plurality of number of times to increase the diagnostic reliability. Three channels are arranged for each of the output and input of one I/O board in this embodiment, but the number of channels is not particularly limited. For example, eight channels are arranged for each of the output and input of an actual I/O board, and many I/O boards are arranged in the I/O circuit. A diagnostic circuit identical to the above-described one is arranged for each board.

In the above-described embodiment, a "1" signal is output as a digital diagnostic signal with a timing shift. It is also possible to set the level of each channel to "1" in self-diagnosis and generate a "0" signal with a timing shift.

The first embodiment concerns a digital I/O circuit system, but this arrangement can also be applied to an analog I/O circuit system.

Figure 4:
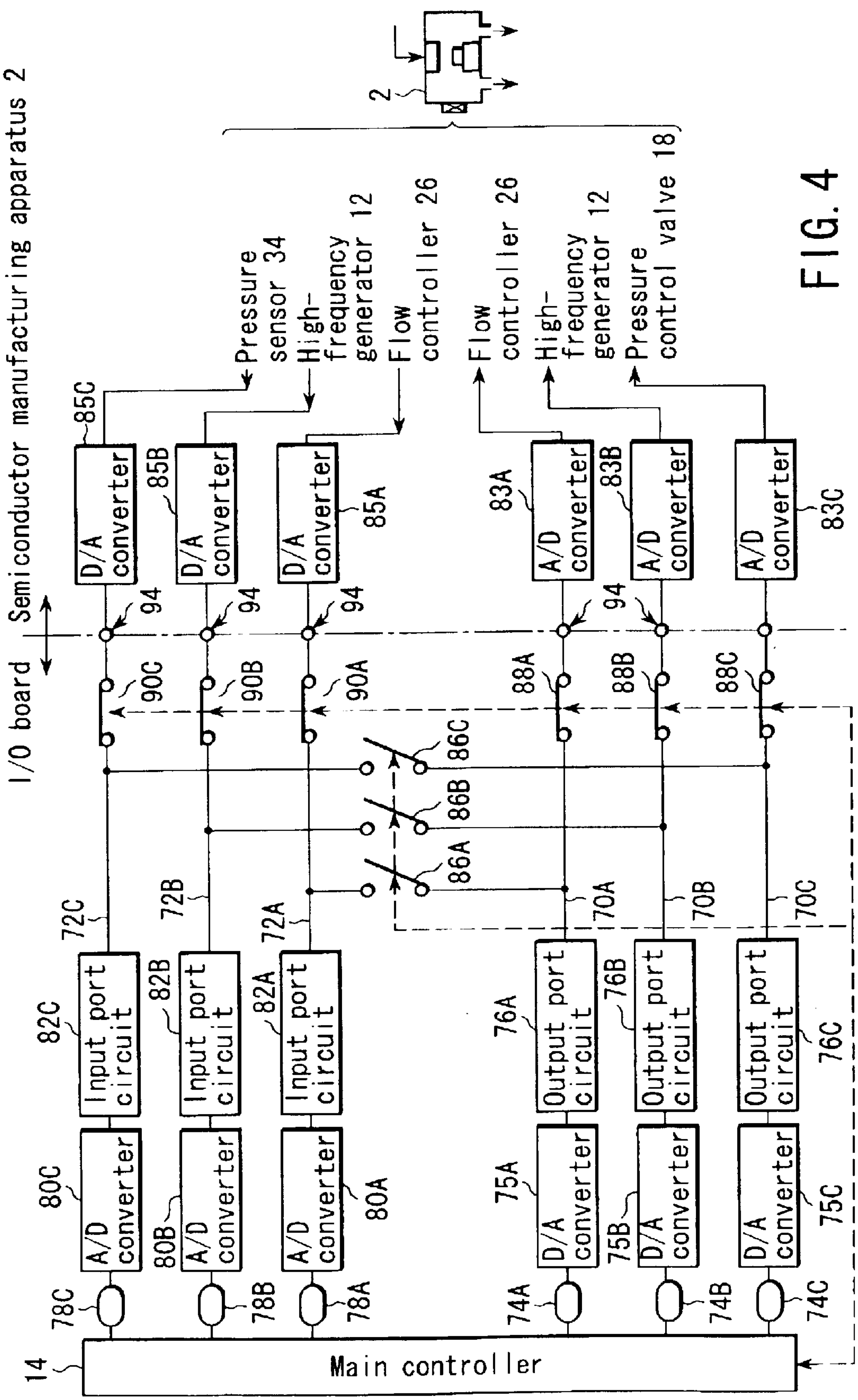
FIG. 4 is a diagram showing the arrangement of the self-diagnostic circuit of an I/O circuit system according to the second embodiment of the present invention.

The second embodiment according to the present invention will be explained with reference to FIG. 4 showing an example in which the self-diagnostic circuit of an I/O circuit system driven by an analog signal is applied to a semiconductor manufacturing apparatus 2. In the second embodiment, the same reference numerals as in FIG. 2 denote the same parts, and a description thereof will be omitted. FIG. 5 is a waveform chart showing an analog self-diagnostic signal used for self-diagnosis in this embodiment.

Output analog channels 70A, 70B, and 70C, and input analog channels 72A, 72B, and 72C are arranged for one I/O board as a plurality of, e.g., three paths for a main controller 14. The output analog channels 70A to 70C are connected to photocouplers 74A to 74C, D/A converters 75A to 75C, and output port circuits 76A to 76C in which various circuit elements are integrated. The input analog channels 72A to 72C are connected to photocouplers 78A to 78C, A/D converters 80A to 80C, and input port circuits 82A to 82C in which various circuit elements are integrated.

The output analog channels 70A to 70C, and input analog channels 72A to 72C are terminated at many terminals 94. The arrangement up to the terminals 94 constitutes an analog I/O circuit system. More specifically, these building portions are mounted on an I/O board.

Various driving systems and sensors of the semiconductor manufacturing apparatus 2 are connected to this I/O circuit system. The output analog channels 70A to 70C are respectively connected via A/D converters 83A to 83C to, e.g., a flow controller 26, high-frequency generator 12, pressure control valve 18, and high-voltage generator (not shown) serving as loads. The input analog channels 72A to 72C are respectively connected via D/A converters 85A to 85C to, e.g., the return signal line of the flow controller 26, the return signal line of the high-frequency generator 12, and a pressure sensor 34.

In the arrangement shown in FIG. 4, the analog channels 70A to 70C and 72A to 72C are connected to various driving systems and sensors via the independently arranged A/D converters 83A to 83C or D/A converters 85A to 85C. However, the analog channels 70A to 70C and 72A to 72C may be connected to A/D converters or D/A converters arranged in respective driving systems and sensors.

The self-diagnostic circuit as the feature of the present invention is arranged in the I/O circuit system having the above arrangement.

As shown in FIG. 4, tie switches 86A, 86B, and 86C are respectively interposed between the output analog channels 70A to 70C and the input analog channels 72A to 72C. The tie switches 86A to 86C are connected between output port circuits 76A to 76C and input port circuits 82A to 82C, and the respective terminals 94.

Self-diagnostic switches 88A, 88B, and 88C are respectively located on the input sides of the terminals 94 of the output analog channels 70A to 70C. Self-diagnostic switches 90A, 90B, and 90C are respectively located on the input sides of the terminals 94 of the input analog channels 72A to 72C.

In normal operation, the tie switches 86A to 86C are open, and the self-diagnostic switches 88A to 88C and 90A to 90C are in a conductive state. In self-diagnosis, the tie switches 86A to 86C are in a conductive state, and the self-diagnostic switches 88A to 88C and 90A to 90C are open. The tie switches 86A to 86C, and self-diagnostic switches 88A to 88C and 90A to 90C can adopt semiconductor switches such as FETs or relay switches, and are integrally in a nonconductive state/in a conductive state under the control of the main controller 14.

Self-diagnostic operation in the I/O circuit system having this arrangement will be explained.

To normally operate the semiconductor manufacturing apparatus 2, the tie switches 86A to 86C are in a nonconductive state, and the self-diagnostic switches 88A to 88C and 90A to 90C are in a conductive state. FIG. 4 shows a normal operation state.

In this state, the main controller 14 individually sends control signals complying with the semiconductor device manufacturing process to the output analog channels 70A to 70C. The flow controller 26, high-frequency generator 12, pressure control valve 18, high-voltage generator (not shown), and the like are respectively controlled. At the same time, return signals from these building portions and a sensor signal from the pressure sensor 34 are input to the main controller 14 via the input analog channels 72A to 72C.

Self-diagnosis is performed when whether the I/O circuit is properly connected is to be checked at the start of operation after a wiring cable is temporarily disconnected for maintenance or repair of the semiconductor manufacturing apparatus and then connected, or when any electrical fault occurs in the I/O circuit and the I/O circuit must be checked to detect the faulty portion.

In self-diagnosis, the respective switches are switched to directions opposite to those in normal operation. More specifically, the self-diagnostic switches 88A to 88C and 90A to 90C are in a nonconductive state to disconnect the semiconductor manufacturing apparatus 2. All the tie switches 86A to 86C are in a conductive state to construct loopback. As a result, the output analog channels 70A to 70C and input analog channels 72A to 72C are in a conductive state (short-circuited).

The main controller 14 outputs analog self-diagnostic signals as shown in FIG. 5 to the output analog channels 70A to 70C. The main controller 14 reads return signals which appear in the input analog channels 72A to 72C.

In this example, the analog self-diagnostic signal has different application voltage values for the respective output analog channels 70A to 70C. For example, 1 V is applied to the first output analog channel 70A; 2 V, to the second output analog channel 70B; and 3 V, to the third output analog channel 70C. In this case, if the wiring is disconnected or a defective element exists in a loop (channel), a return signal from this loop cannot be detected. If the channels are short-circuited, voltage values different from input voltages are obtained as return signals in the channels. Hence, short-circuiting between wiring lines or generation of a defective element can be quickly, easily recognized and detected.

In this example, the voltage of the self-diagnostic signal is changed by 1 V for each channel, but the difference voltage is not particularly limited. However, different voltage values are desirable because a defective portion cannot be determined with a plurality of self-diagnostic signals having the same voltage values. That is, short-circuiting between channels cannot be recognized.

In the second embodiment, the voltage value applied to each output analog channel is constant, as shown in FIG. 5. However, the voltage value is not limited to this, and may be changed stepwise at different timings, like analog self-diagnostic signals shown in FIGS. 6A to 6C.

FIG. 6A shows the waveform of a self-diagnostic signal applied to the first output analog channel 70A. FIG. 6B shows the waveform of a self-diagnostic signal applied to the second output analog channel 70B. FIG. 6C shows the waveform of a self-diagnostic signal applied to the third output analog channel 70C.

As shown in FIGS. 6A to 6C, the voltage value is changed stepwise by 1 V from 1 to 3 V, and applied to the channels 70A, 70B, and 70C. Further, the application timing is different between the channels. By sequentially changing and applying the voltage value of the self-diagnostic signal, whether adjustment of the gain or the like in the output and input port circuits 76A to 76C and 82A to 82C is appropriate can be confirmed.

Three channels are arranged for each of the output and input of one I/O board in this embodiment, but the number of channels is not particularly limited. For example, eight channels are arranged for each of the output and input of an actual I/O board, and many I/O boards are arranged in the I/O circuit. A diagnostic circuit identical to the above-described one is arranged for each board. In this case, self-diagnosis is executed using a self-diagnostic signal voltage having eight voltage values different by 1 V from 1 to 8 V.

Figure 7:
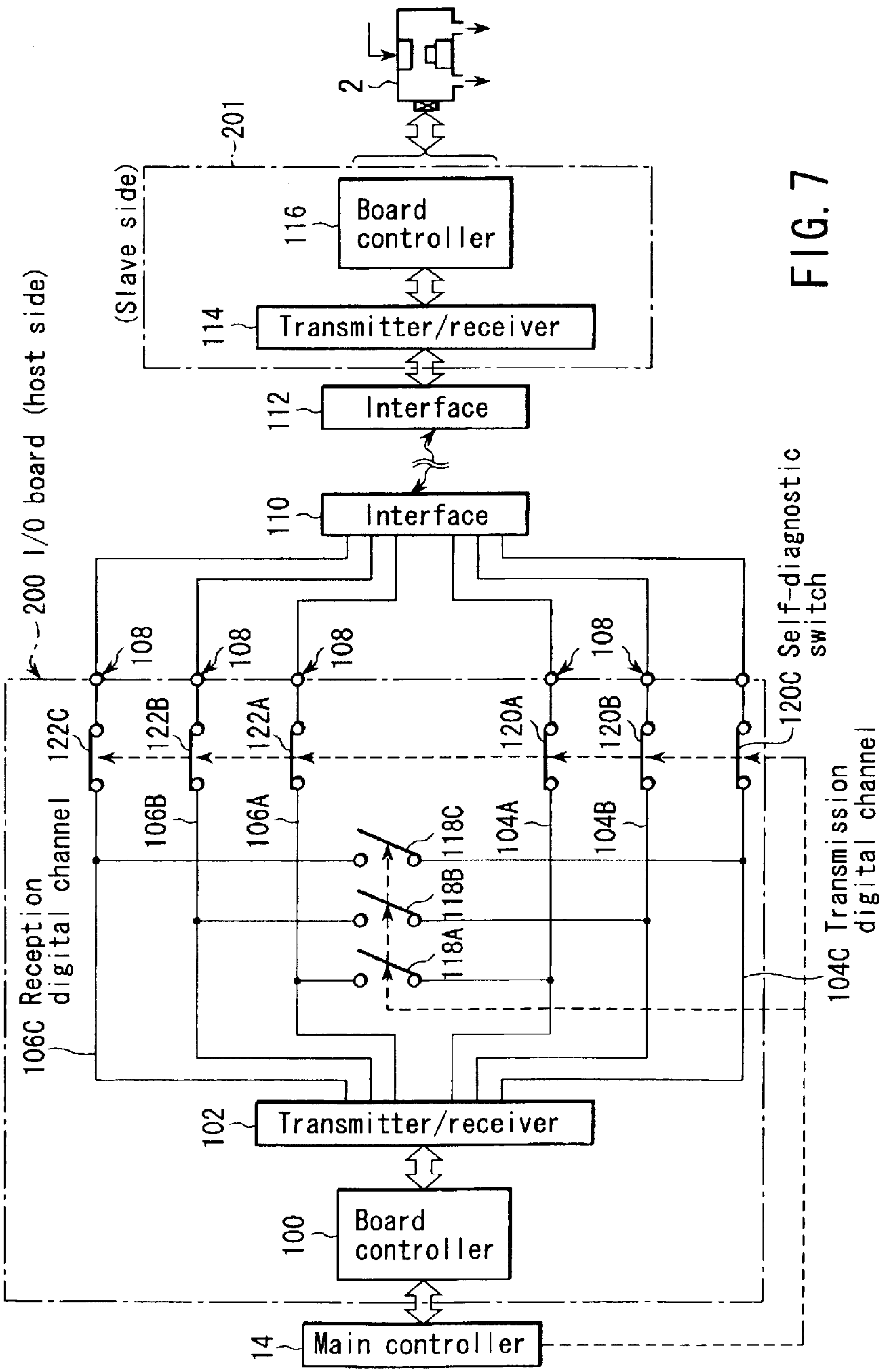
FIG. 7 is a diagram showing the arrangement of the self-diagnostic circuit of an I/O circuit system according to the third embodiment of the present invention.

The third embodiment according to the present invention will be explained with reference to FIG. 7 showing an example in which the self-diagnostic circuit of an I/O circuit system having a communication function is applied to a semiconductor manufacturing apparatus 2. FIG. 8 shows waveform charts of a digital self-diagnostic signal used for self-diagnosis in this embodiment. Serial communication is assumed as the communication method, and a plurality of, e.g., three signal channels are adopted for a main controller 14.

In this arrangement, the main controller 14 having a host computer which controls the whole operation of the semiconductor manufacturing apparatus 2 is connected to a host-side communication I/O board 200. The semiconductor manufacturing apparatus 2 is connected to a slave-side I/O board 201 having the same arrangement as that of the host side. Data is exchanged between the host and slave sides by serial communication.

The I/O board 200 comprises a board controller 100 having a microcomputer or the like, and a transmitter/receiver 102 having, e.g., an integrated circuit (RS232C) having a transmission/reception communication function. The transmitter/receiver 102 is connected to, e.g., three transmission digital channels 104A to 104C and three reception digital channels 106A to 106C.

The channels 104A to 104C and 106A to 106C are terminated at terminals 108. Each terminals 108 is connected to an interface 110 to actually perform transmission/reception with the slave side.

The slave side also comprises an interface 112, transmitter/receiver 114, board controller 116, and the like. The control signals of a matching box 10, cooling jacket 42, and pressure control valve 18, their return signals, and the like can be communicated between the salve and host sides. Note that FIG. 7 illustrates only one slave-side I/O board. In practice, a plurality of slave-side I/O boards are parallel-connected, and each I/O board can individually, independently communicate data to the host side.

The self-diagnostic circuit as the feature of the present invention is arranged in the I/O circuit system having the above arrangement.

More specifically, tie switches 118A, 118B, and 118C which connect the transmission digital channels 104A to 104C and reception digital channels 106A to 106C are interposed between the transmitter/receiver 102 and the respective terminals 108 on the I/O board.

Self-diagnostic switches 120A, 120B, and 120C are respectively interposed between the nodes of the tie switches 118A to 118C on one side and the respective terminals 108 on the transmission digital channels 104A to 104C. Self-diagnostic switches 122A, 122B, and 122C are respectively interposed between the nodes of the tie switches 118A to 118C on the other side and the respective terminals 108 on the reception digital channels 106A to 106C.

The tie switches 118A to 118C integrally operate to be in a nonconductive state in normal operation (transmission/reception) and in a conductive state in self-diagnosis. The self-diagnostic switches 120A to 120C and 122A to 122C integrally operate to be in a conductive state in normal operation and in a nonconductive state in self-diagnosis. The tie switches 118A to 118C and the self-diagnostic switches 120A to 120C and 122A to 122C can use either semiconductor switches such as FETs or relay switches.

Self-diagnostic operation using serial communication in the I/O circuit system having this arrangement will be explained.

In normal operation (transmission/reception), i.e., to operate the semiconductor manufacturing apparatus 2, the tie switches 118A to 118C are in a nonconductive state, and the self-diagnostic switches 120A to 120C and 122A to 122C are in a conductive state. FIG. 7 shows a normal operation state. In this state, necessary data is exchanged between the host-side main controller 14 and the slave side.

Self-diagnosis is performed when whether the I/O circuit is properly connected is to be checked at the start of operation after a wiring cable is temporarily disconnected for maintenance or repair of the semiconductor manufacturing apparatus and then connected, or when any electrical fault occurs in the I/O circuit and the I/O circuit must be checked to detect the faulty portion.

In self-diagnosis, the tie switches and self-diagnostic switches are switched to be in an opposite state to those in normal operation. More specifically, the self-diagnostic switches 120A to 120C and 122A to 122C are in a nonconductive state to disconnect the slave side. All the tie switches 118A to 118C are in a conductive state to construct loop-back. As a result, the transmission digital channels 104A to 104C and reception digital channels 106A to 106C are electrically connected.

The main controller 14 outputs, e.g., self-diagnostic signals of pulse sequence codes as shown in FIGS. 8A to 8C to the transmission digital channels 104A to 104C. The main controller 14 reads return signals which appear in the reception digital channels 106A to 106C.

These self-diagnostic signals have different codes for the respective transmission digital channels 104A to 104C. For example, a code shown in FIG. 8A is sent to the first transmission digital channel 104A. A code shown in FIG. 8B is sent to the second transmission digital channel 104B. A code shown in FIG. 8C is sent to the third transmission digital channel 104C. If a channel is disconnected or suffers a defective element, a return signal from the channel is not detected.

If the channels are short-circuited, pulse sequences different from the above-mentioned codes are obtained as return signals in the channels. Thus, short-circuiting or generation of a defective element can be quickly, easily recognized and detected for every channel.

In this case, self-diagnostic signals are simultaneously sent, but the sending timings of these signals may be changed. In this case, when channels are short-circuited, the channels which are short-circuited can be easily detected. Note that the number of channels is three in this embodiment, but is not limited to this. This embodiment has exemplified a single-wafer processing type semiconductor manufacturing apparatus. The present invention is not limited to this, and can also be easily applied to a batch processing type semiconductor manufacturing apparatus.

The object to be processed is not limited to a semiconductor wafer, and can also be a glass substrate, LCD substrate, and the like.

As has been described above, the self-diagnostic circuit of the I/O circuit system according to the present invention can exhibit the following excellent operation effects.

In self-diagnosis, the self-diagnostic switches which are connected to the load side and power supply side are in a nonconductive state to disconnect the load and sensor. The tie switches are in a conductive state to electrically connect the input digital channels and output digital channels. Digital self-diagnostic signals are supplied to these channels, and their return signals are detected. An electrically defective portion can be quickly, easily detected.

Since the self-diagnostic switches are commonly used, the number of self-diagnostic switches arranged can be reduced.

In self-diagnosis, the self-diagnostic switches which are connected to the load side and power supply side are in a nonconductive state to disconnect the load and an object to be controlled. The tie switches are in a conductive state to electrically connect the input digital channels and output digital channels. Digital self-diagnostic signals are supplied to these channels, and their return signals are detected. An electrically defective portion can be quickly, easily detected.

Since channels are simultaneously diagnosed, the self-diagnostic time can be shortened. The voltage value of an analog self-diagnostic signal is changed. Whether gain adjustment of an amplifier is appropriate can be more accurately self-diagnosed.

A portion where an electrical defect exists in a transmission digital channel or reception digital channel can be quickly, easily detected.

Industrial Applicability

The present invention can provide a self-diagnostic circuit for an I/O circuit system that can quickly, easily detect an electrically defective portion in the circuit arrangement of an apparatus.

According to the present invention, an I/O circuit system incorporated in the controller of a semiconductor manufacturing apparatus or the like comprises a self-diagnostic circuit in which tie switches are interposed between output channels which output control signals in order to drive and control apparatus-side driving portions constructed on an I/O board, and input channels which input return signals in response to the control signals, and self-diagnostic switches which are arranged on power supply lines for supplying power to the driving portions of the apparatus and stop power supply to the driving portions are arranged. In normal operation, the tie switches are in a nonconductive state, and the self-diagnostic switches are in a conductive state, outputting signals to apparatus-side building portions via the output digital channels. Return signals from the building portions or sensor signals from sensors attached to the building portions are input to the main controller via the input channels, controlling the building portions. In self-diagnosis, the self-diagnostic switches are in a nonconductive state, and all the tie switches are in a conductive state to electrically disconnect the apparatus. The loopbacks of the output and input channels are constructed. If a return signal corresponding to a self-diagnostic signal output from the main controller is returned, no electrical fault is determined to occur. If no return signal is returned, an electrical fault is determined to have occurred.

What is claimed is:

1. A self-diagnostic circuit for an I/O circuit system comprising a plurality of output digital channels which individually send control signals from a main controller to loads serving as objects to be controlled, and a plurality of input digital channels which input sensor signals to the main controller from a plurality of sensors attached to the objects to be controlled, tie switches which are normally in a nonconductive state and in a conductive state while making a self-diagnosis, respectively interposed between the plurality of output digital channels and the plurality of input digital channels, and self-diagnostic switches, which are normally in a conductive state and in a nonconductive state while making a self-diagnosis, respectively connected to power supply sides of the loads on the plurality of output digital channels, and ground sides of the sensors on the plurality of input digital channels, in self-diagnosis, the main controller outputting a digital self-diagnostic signal and receiving a return signal.

2. A self-diagnostic circuit for an I/O circuit system according to claim 1, wherein the ground sides of the plurality of sensors are commonly connected to the self-diagnostic switch, and the power supply sides of the loads are commonly connected to another self-diagnostic switch.

3. A self-diagnostic circuit for an I/O circuit system according to claim 1, wherein when a signal from one of the plurality of output digital channels is "0" or "1" as the self-diagnostic signal, signals from all remaining channels change to be opposite to the signal from said one channel.

4. A self-diagnostic circuit for an I/O circuit system according to claim 2, wherein when a signal from one of the plurality of output digital channels is "0" or "1" as the self-diagnostic signal, signals from all remaining channels change to be opposite to the signal from said one channel.

5. A self-diagnostic circuit for an I/O circuit system comprising a plurality of output analog channels which individually send control signals from a main controller to loads serving as objects to be controlled, and a plurality of input analog channels which input analog signals from the objects to be controlled to the main controller, tie switches, which are normally in a nonconductive state and in a conductive state while making a self-diagnosis are respectively interposed between the plurality of output analog channels and the plurality of input analog channels, and self-diagnostic switches, which are normally in the conductive state and in the nonconductive state while making the self-diagnosis, respectively connected to the plurality of output analog channels and the plurality of input analog channels, in self-diagnosis, the main controller outputting analog self-diagnostic signals having different voltage values to the respective output analog channels and receiving return signals.

6. A self-diagnostic circuit for an I/O circuit system according to claim 5, wherein the analog self-diagnostic signals are different from each other by 1 V.

7. A self-diagnostic circuit for an I/O circuit system according to claim 6, wherein the analog self-diagnostic signals are simultaneously output.

8. A self-diagnostic circuit for an I/O circuit system according to claim 5, wherein voltage values of the analog self-diagnostic signals are sequentially changed stepwise.

9. A self-diagnostic circuit for an I/O circuit system comprising a main controller, a transmitter/receiver which is connected to the main controller and has a transmission function and a reception function, a transmission digital channel which is connected to the transmitter/receiver and outputs transmission data, a reception digital channel which inputs externally received reception data to the transmitter/receiver, and an interface which interfaces the transmission data and the reception data, a tie switch which is in a nonconductive state in transmission/reception and in a conductive state in self-diagnosis is interposed between the transmission digital channel and the reception digital channel, self-diagnostic switches which are in a conductive state in transmission/reception and in a nonconductive state in self-diagnosis are respectively connected to the transmission digital channel and the reception digital channel, and in self-diagnosis, the main controller outputting digital self-diagnostic signals having predetermined codes and receiving return signals.

10. A self-diagnostic circuit for an I/O circuit system according to claim 9, wherein the transmission digital channel and the reception digital channel include a plurality of transmission digital channels and a plurality of reception digital channels, and the codes of the digital self-diagnostic signals are different from each other.

11. A self-diagnostic circuit mounted in an I/O circuit system which is incorporated in a main controller that controls and drives an apparatus having a plurality of driving portions, and which has plurality of output and input channels that exchange driving/control signals to the apparatus and return signals, comprising:

tie switches which connect the corresponding output channels and input channels in the I/O circuit; and self-diagnostic switches which are arranged on power supply lines that supply power to the driving portions of the apparatus in the I/O circuit, and which stop power supply to the driving portions, wherein in normal operation, the apparatus is driven and controlled by the main controller via the tie switches in a nonconductive state and the self-diagnostic switches in a conductive state, and in self-diagnosis, self-diagnostic signals output from the main controller to the output channels are returned to the main controller via the input channels by using the tie switches in the conductive state and the self-diagnostic switches in the nonconductive state, determining that the I/O circuit system is normal.

12. A self-diagnostic circuit for an I/O circuit system according to claim 11, wherein the self-diagnostic signals are having 1-pulse signals whose timings are different between channels.

13. A self-diagnostic circuit for an I/O circuit system according to claim 11, wherein the self-diagnostic signals are having pulse code signals having different numbers of pulses of one cycle between channels.

14. A self-diagnostic circuit for an I/O circuit system according to claim 11 that exchanges the driving/control signals to the apparatus and the return signals by radio communication.

15. A self-diagnostic circuit mounted in an I/O circuit system which is incorporated in a main controller that controls and drives an apparatus having a plurality of driving portions, and which has plurality of output and input channels, comprising:

tie switches which connect the corresponding output channels and input channels in the I/O circuit; and self-diagnostic switches which are arranged on lines of the output and input channels in the I/O circuit and electrically disconnect the driving portions of the apparatus, wherein in normal operation, the apparatus is driven and controlled by the main controller via the tie switches in a nonconductive state and the self-diagnostic switches in a conductive state, and in self-diagnosis, self-diagnostic signals output from the main controller to the output channels are returned to the main controller via the input channels by using the tie switches in the conductive state and the self-diagnostic switches in the nonconductive state, determining that the I/O circuit system is normal.

16. A self-diagnostic circuit for an I/O circuit system according to claim 15, wherein the self-diagnostic signals are having constant-voltage signals whose voltage values are different between channels.

17. A self-diagnostic circuit for an I/O circuit system according to claim 15, wherein the self-diagnostic signals are having stepwise voltage signals whose voltage values change stepwise with a timing shift between channels.

18. A semiconductor manufacturing apparatus comprising a self-diagnostic circuit for an I/O circuit system comprising:

a plurality of output digital channels which individually send control signals from a main controller to loads serving as objects to be controlled, and a plurality of input digital channels which input sensor signals to the main controller from a plurality of sensors attached to the objects to be controlled, tie switches which are normally in a noncductive state and in a conductive state while making a self-diagnosis, respectively interposed between the plurality of output digital channels and the plurality of input digital channels, and self-diagnostic switches, which are normally in a conductive state in a nonconductive state while making a self-diagnosis, respectively connected to power supply sides of the loads on the plurality of output digital channels, and ground sides of the sensors on the plurality of input digital channels, in self-diagnosis, the signal and receiving a return signal.

19. A semiconductor manufacturing apparatus according to claim 18, wherein the ground side of the plurality of sensors are commonly connected to the self-diagnostic switch, and the power supply sides of the loads are commonly connected to another self-daignostic switch.

20. A semiconductor manufacturing apparatus according to claim 18, wherein when a signal from one of the plurality of output digital channels is "0" or "1" as the self-diagnostic signal, signals from all remaining channels chnage to be opposite to the signal from said one channel.

21. A semiconductor manufacturing apparatus according to claim 19, wherein when a signal from one of the plurality of output digital channels if "0" or "1" as the self-diagnostic signal, signals form all remaining channels change to be opposite to the signal from said one channel.

22. A semiconductor manufacturing apparatus comprising a self-diagnostic circuit for an I/O circuit system comprising:

a plurality of output analog channels which individually send control signals from a main controller to loads serving as objects to be controlled, and a plurality of input analog channels which input analog signals from the objects to be controlled to the main controller, tie switches, which are normally in a nonconductive state and in a conductive state while making a self-diagnosis are respectively interposed between the plurality of output analog channels and the plurality of input analog channels, and self-diagnostic switches, which are normally in the conductive state and in the non-conductive state while making the self-diagnosis, respectively connected to the plurality of output analog channels and the plurality of input analog channels, in self-diagnosis, the main controller outputting analog self-diagnostic signals having different voltage values to the respective output analog channels and receiving return signals.

23. A semiconductor manufacturing apparatus according to claim 22, wherein the analog self-diagnostic signals are different from each other by 1 V.

24. A semiconductor manufacturing apparatus according to claim 23, wherein the analog self-diagnostic signals are simultaneously output.

25. A semiconductor manufacturing apparatus according to claim 22, wherein voltages values of the analog self-diagnostic signals are sequentially changed stepwise.

26. A semiconductor manufacturing apparatus comprising a self-diagnostic circuit for an I/O circuit system comprising:

a main controller, a transmitter/receiver which is connected to the main controller and has a transmission function and a reception function, a transmission digital channel which is connected to the transmitter/receiver and outputs transmission data, a reception digital channel which inputs externally received reception data to the reception data, a tie switch which is in a nonconductive state in transmission/reception and in a conductive state in self-diagnosis is interposed between the transmission digital channel and the reception digital channel, self-diagnostic switches which are in a conductive state in transmission/reception and in a nonconductive state in self-diagnosis are respectively connected to the transmission digital channel and the reception digital channel, and in self-diagnosis, the main controller outputting digital self-diagnostic signals having predetermined codes and receiving return signals.

27. A semiconductor manufacturing apparatus according to claim 26, wherein the transmission digital channel and the reception digital channel include a plurality of transmission digital channels and a plurality of reception digital channels, and the codes of the digital self-diagnostic signals are different from each other.

28. A semiconductor manufacturing apparatus comprising a self-diagnostic circuit mounted in an I/O circuit system which is incorporated in a main controller that controls and drives an apparatus having a plurality of driving portions, and which has plurality of output and input channels that exchange driving/control signals to the apparatus and return signals, said self-diagnostic circuit comprising:

tie switches which connect the corresponding output channels and input channels in the I/O circuit; and self-diagnostic switches which are arranged on power supply lines that supply power to the driving portions of the apparatus in the I/O circuit, and which stop power supply to the driving portions, wherein:

in normal operation, the apparatus is driven and controlled by the main controller via the tie switches in a nonconductive state and the self -diagnostic switches in a conductive state, and in self-diagnosis, self-diagnostic signals output from the main controller to the output channels are returned to the main controller via the input channels by using the tie switches in the conductive state and the self-diagnostic switches in the nonconductive state, determining that the I/O circuit system is normal.

29. A semiconductor manufacturing apparatus according to claim 28, wherein the self-diagnostic signals are having 1-pulse signals whose timings are different between channels.

30. A semiconductor manufacturing apparatus according to claim 28, wherein the self-diagnostic signals are having pulse code signals having different numbers of pulses of one cycle between channels.

31. A semiconductor manufacturing apparatus according to claim 28 that exchanges the driving/control signals to the apparatus and the return signals by radio communication.

32. A semiconductor manufacturing apparatus comprising a self-diagnostic circuit mounted in an I/O circuit system which is incorporated in a main controller that controls and drives an apparatus having a plurality of driving portions, and which has plurality of output and input channels, said self-diagnostic circuit comprising:

tie switches which connect the corresponding output channels and input channels in the I/O circuit; and self-diagnostic switches which are arranged on lines of the output and input channels in the I/O circuit and electrically disconnect the driving portions of the apparatus, wherein:

in normal operation, the apparatus is driven and controlled by the main controller via the tie switches in a nonconductive state and the self-diagnostic switches in a conductive state, and in self-diagnosis, self-diagnostic signals output from the main controller to the output channels are returned to the main controller via the input channels by using the tie switches in the conductive state and the self-diagnostic switches in the nonconductive state, determining that the I/O circuit system is normal.

33. A semiconductor manufacturing apparatus according to claim 32, wherein the self-diagnostic signals are having constant-voltage signals whose voltage values are different between channels.

34. A semiconductor manufacturing apparatus according to claim 32, wherein the self-diagnostic signals are having stepwise voltage signals whose voltage values change stepwise with a timing shift between channels.

* * * * *